United States Patent [19]
Plevyak

[11] 3,803,978
[45] Apr. 16, 1974

[54] SELF DRIVEN TURRET LATHE ROTATING TOOL ATTACHMENT

[76] Inventor: Joseph B. Plevyak, 19 Jefferson St., Newton, N.J. 07860

[22] Filed: Feb. 5, 1973

[21] Appl. No.: 329,492

Related U.S. Application Data

[62] Division of Ser. No. 87,976, Nov. 9, 1972, Pat. No. 3,733,622.

[52] U.S. Cl.................. 90/11 R, 90/DIG. 1, 29/57
[51] Int. Cl............................................. B23c 7/02
[58] Field of Search............ 90/11 R, 11 A, DIG. 1; 29/57

[56] References Cited
UNITED STATES PATENTS
2,453,315   11/1948   Harbison.......................... 90/DIG. 1
1,435,453   11/1922   Davis et al......................... 29/57 X Primary Examiner—Gil Weidenfeld

[57] ABSTRACT

A turret lathe rotating tool attachment is provided with gear ring to effect rotation of a rotary tool in response to a mere bumping of a laterally extending rack bar slide as by the manipulation of the lathe cross slide that can be cam operated from the lathe machine drive. The attachment is self contained and has a rearwardly extending shank that is adapted to be secured in a radially extending opening in the turret head and clamped therein against rotation and axial movement therefrom. A spindle is provided in each of the forms of this invention which will be rotated at sufficient speed to effect with a drill or tapping element a completed operation upon a workpiece. In one of the forms of the invention provision is made to pre-accelerate the drive spindle prior to a main drive through a gear train effecting high speed rotation upon the spindle.

1 Claim, 31 Drawing Figures

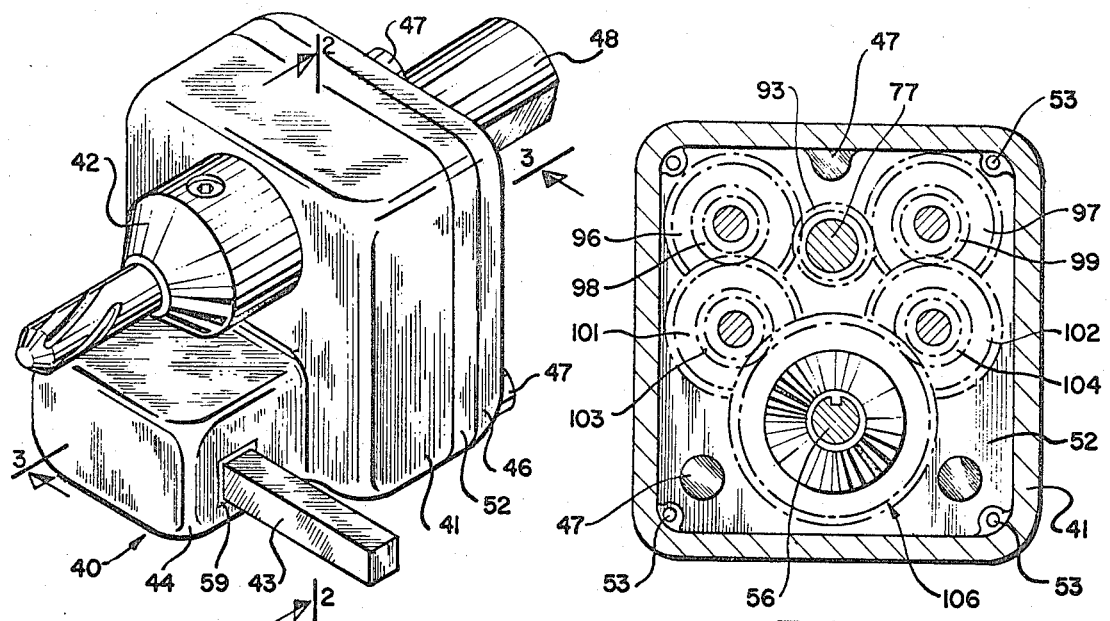
FIG.1.
FIG.2.
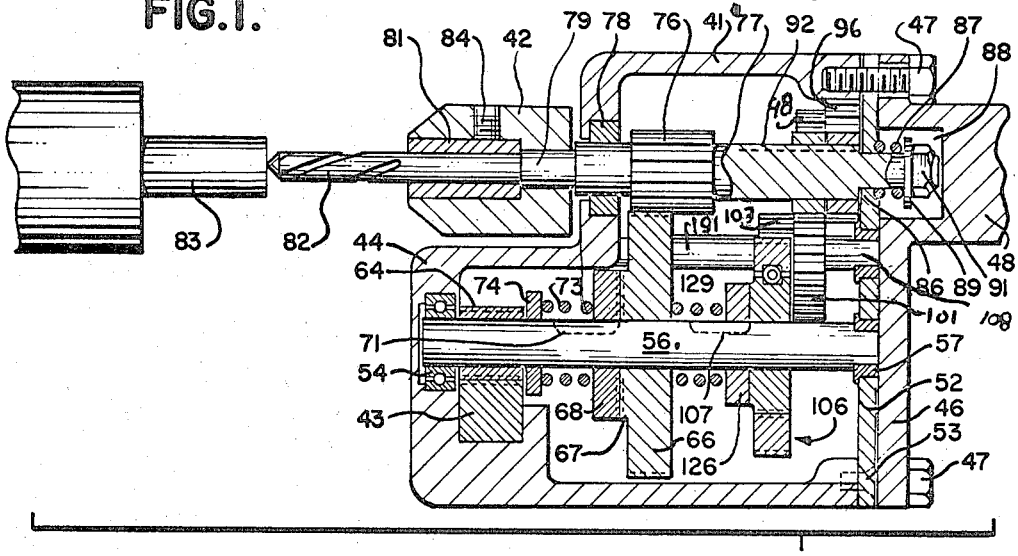
FIG.3.
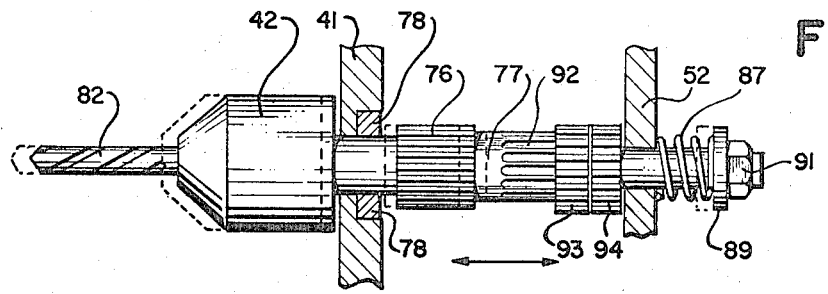
FIG.4.

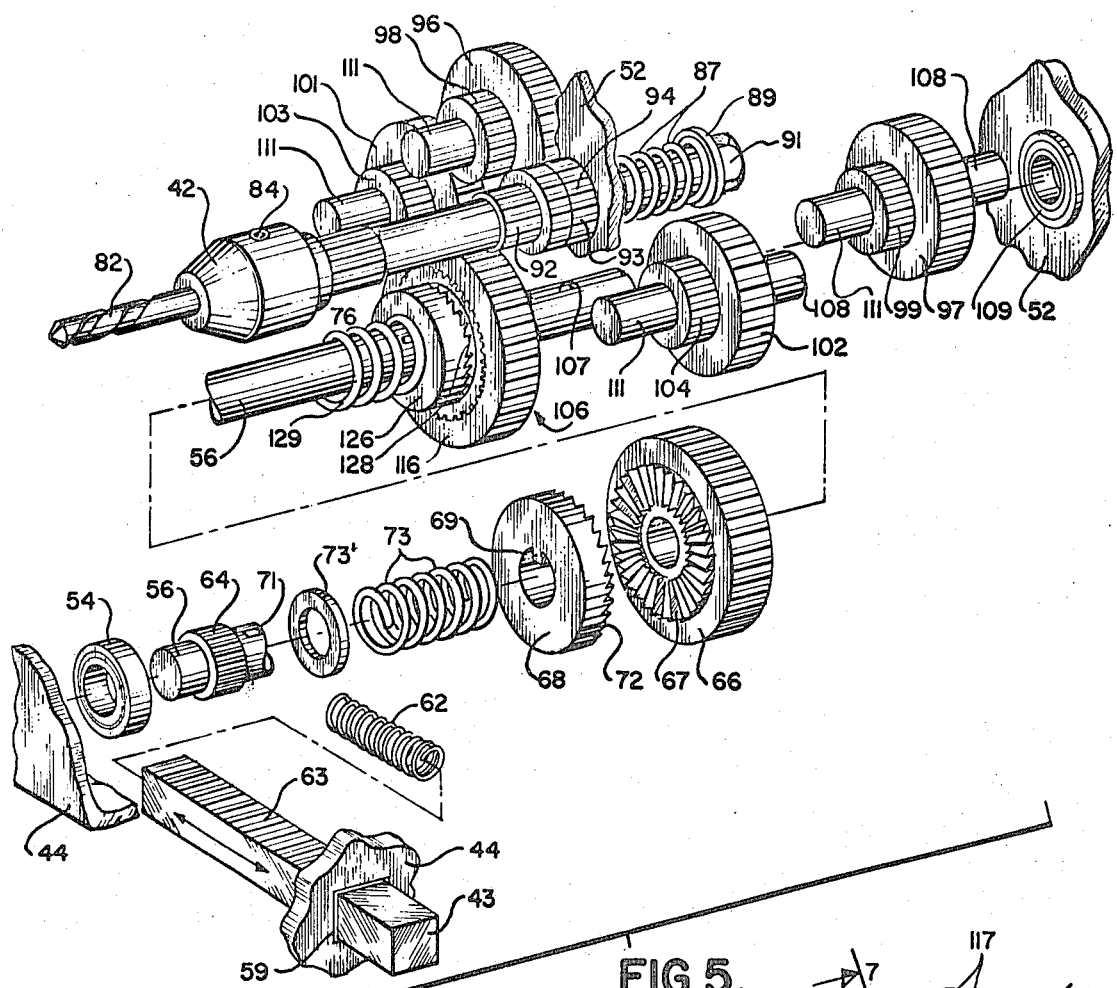
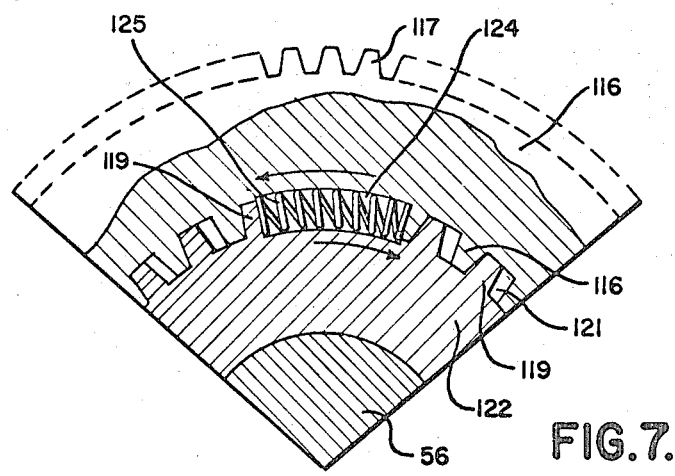
FIG.5.
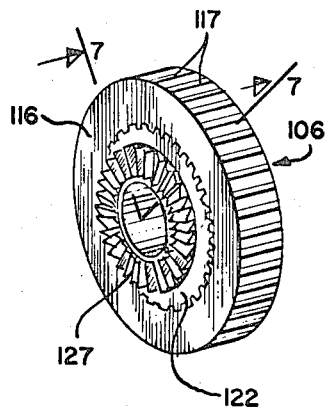
FIG.6.
FIG.7.

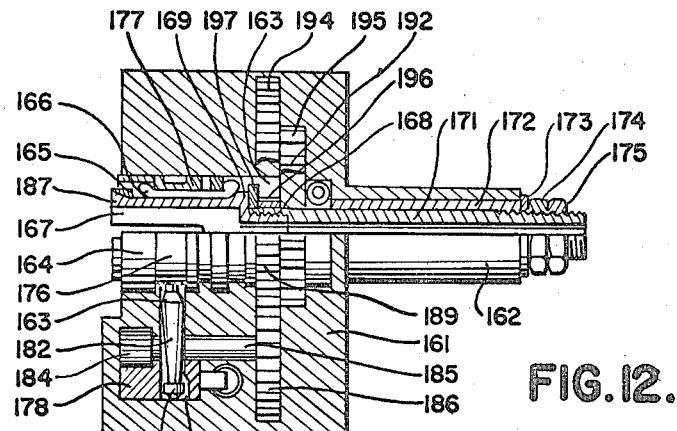
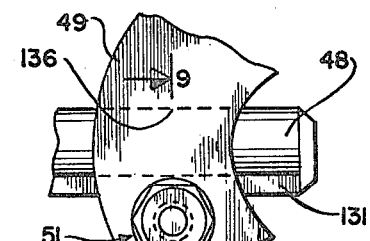
FIG.12.
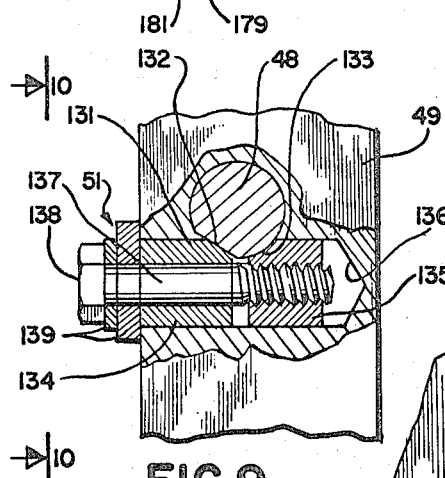
FIG.9.
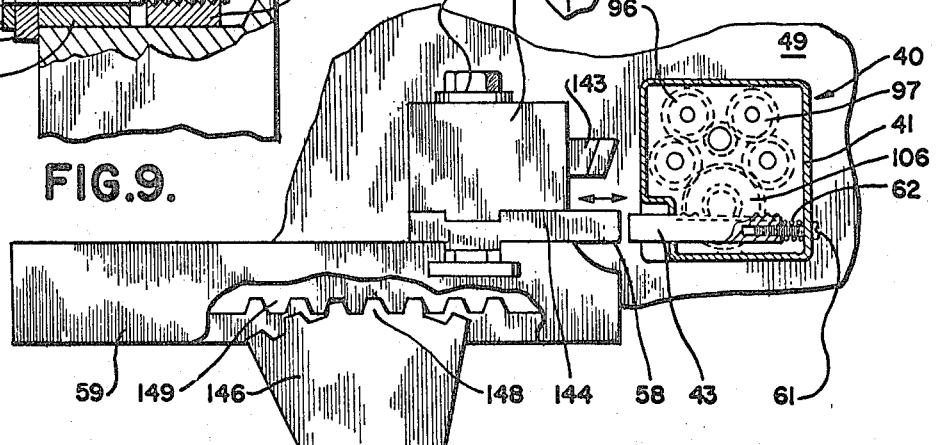
FIG.10.
FIG.8.
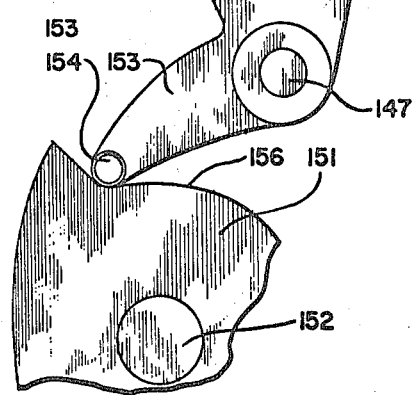

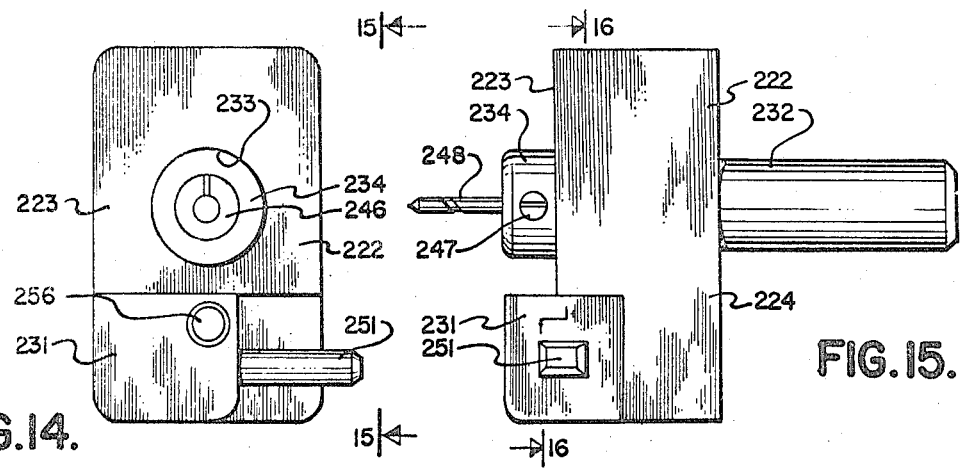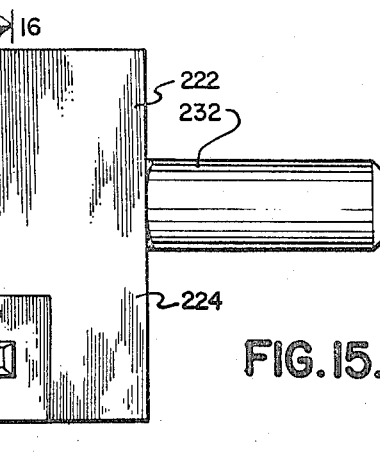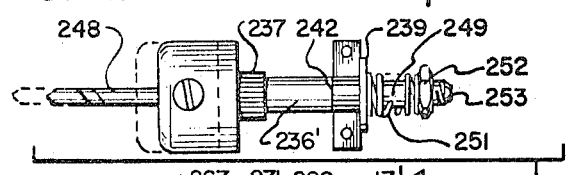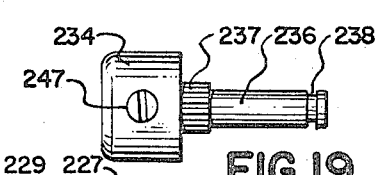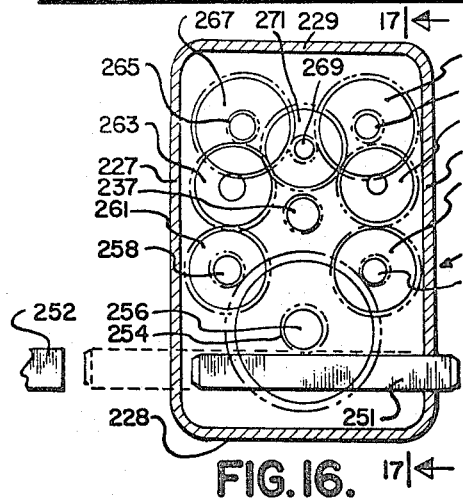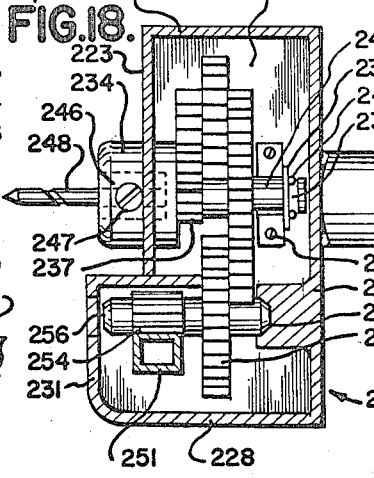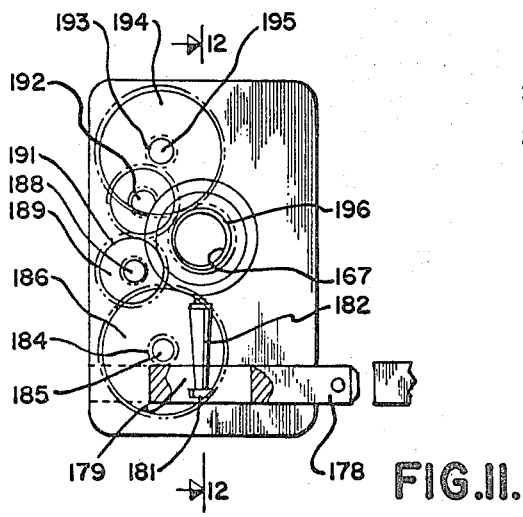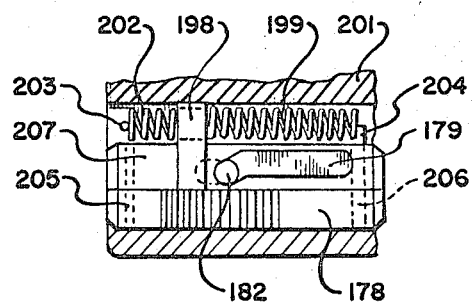

SELF DRIVEN TURRET LATHE ROTATING TOOL ATTACHMENT

This is a division of application Ser. No. 87,976, filed Nov. 9, 1972 now U.S. Pat. No. 3,733,622.

This invention relates to a self driven turret lathe rotating tool attachment and this application is a continuation-in-part of my previous applications, the earlier one being Ser. No. 345,200, filed Feb. 17, 1964 and now U.S. Pat. No. 3,349,656, dated Oct. 31, 1967 and a later application Ser. No. 677,675, filed Oct. 24, 1967 and being issued as U.S. Pat. No. 3,538,731 and dated Nov. 10, 1970.

It is the principal object of the present invention to provide a turret lathe rotating tool attachment which can be operated to effect a drilling or tapping operation upon a workpiece by the mere bumping of a laterally extending slide rack bar from which a train of gears extend for effecting momentary high speed rotation of work tool spindle contained therein.

It is another object of the invention to provide a self driven turret head mounted rotating tool which is of such size that it can be readily and easily mounted upon the turret head and wherein the mounting is effected in the same way that an ordinary turret tool is connected to a turret head and wherein the attachment will be clamped against rotation and axial displacement.

It is another object of the invention to provide a self driven turret lathe rotating tool attachment such as to effect a drill or tapping operation and having a rotating spindle in which means is provided for effecting preacceleration of the rotating spindle prior to the spindle being taken over for rotation by a main drive and gear train and thereby overcome the initial shock to the attachment when its laterally extending drive slide is bumped to transfer the power to the attachment.

It is a further object of the invention to provide a self driven turret lathe rotating tool attachment which will be provided with two drive spindles in order that cross drilling on opposite sides of a workpiece can be effected or in which drilling and tapping operations can be simultaneously effected upon opposite sides of the workpiece or first upon one side of the workpiece and then upon the other.

Other objects of this invention are to provide a self driven rotating tool attachment for turret lathes, having the above objects in mind, which is of simple construction, compact, durable, easy to assemble, easy to mount upon the turret head, easy to align with the workpiece carried on the machine spindle, efficient and automatic in operation.

For a better understanding of the invention, reference may be had to the following detailed description taken in connection with the accompanying drawings, in which:

FIG. 1 is a side and front perspective view of a turret lathe drill tool attachment constructed according to one form of the invention and having a preacceleration spindle mechanism.

FIG. 2 is a vertical sectional view taken on line 2—2 of FIG. 1 and looking upon the gear train and clutch at the rear of the attachment.

FIG. 3 is a fragmentary longitudinal sectional view of the drill attachment as viewed on line 3—3 of FIG. 1 and with a workpiece being shown aligned with the drill element.

FIG. 4 is a fragmentary view of the drill spindle removed from the attachment and detached from the overriding clutch parts.

FIG. 5 is a perspective and collective view of the internal parts of the attachment, some of the parts separated from one another, and other parts in assembly with one another.

FIG. 6 is a perspective view looking upon the workface of one of the overriding clutch parts.

FIG. 7 is a fragmentary plan and sectional view of a segment of the clutch part removed from between arrows 7—7 of FIG. 6 and broken away to show a spring biased of a shock absorbing lost motion connection between two of the clutch parts.

FIG. 8 is a fragmentary elevational view of the cross slide of the turret lathe that has a portion which engages the revolving or drill tool attached to the turret head to move its rack slide operator.

FIG. 9 is a fragmentary sectional view of the clamp parts for locking the shank of the attachment to the turret head against radial displacement therefrom, the view being taken generally on line 9—9 of FIG. 10.

FIG. 10 is a fragmentary top plan view of the turret head looking generally on line 10—10 of FIG. 9, the view showing the attachment shank extended through the turret head and upon the head of the clamping bolt.

FIG. 11 is a front elevational view haivng a rotary spindle and shock receiving drill, drill tap, reamer and other tools for performing back end operations upon a workpiece.

FIG. 12 is a vertical sectional view taken on line 12—12 of FIG. 11.

FIG. 13 is a fragmentary sectional view broken away from the attachment casing of the attachment shown in FIG. 11 and looking in plan upon the slide bar rack, the cam slot therein and the spring biasing mechanism therefor.

FIG. 14 is a front elevational view of another form of the invention showing a drilling and tapping tool attachment and employing a large gear train arrangement.

FIG. 15 is a side elevational view of the drill and tapping tool attachment of FIG. 14 as viewed on line 15—15 thereof.

FIG. 16 is a vertical sectional view taken generally on line 16—16 of FIG. 15 and looking in plan upon the double acting slide bar and in plan upon the multiple gear train.

FIG. 17 is a longitudinal sectional view of the attachment of FIG. 14 as viewed on line 17—17 of FIG. 16.

FIG. 18 is a detail side elevational view of the tap spindle with a retracting spring that can replace the drill spindle that is shown in the attachment in FIGS. 15 and 17.

FIG. 19 is a side elevational view of the drill spindle removed from the attachment.

Figure 20:
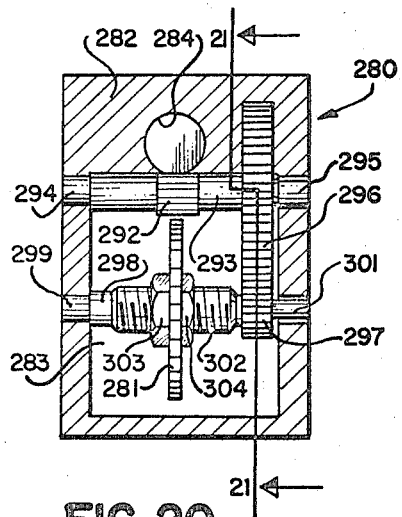
FIG. 20 is a vertical sectional view of a turret slotting and milling tool attachment according to a still further form of the invention and as viewed on line 20—20 of FIG. 21.

Referring now particularly to FIGS. 1 to 6, there is shown a turret head attachment for effecting a drilling operation in which provision is made for pre-acceleration of a gear train assembly to have the drill element enter the work after having been accelerated and to overcome the initial shock load at the point of contact with the workpiece by the drill element. According to this form of the invention, 40 represents generally this pre-accelerated turret head attachment, which comprises generally main housing part 41 from which a drill chuck 42 extends from the front thereof and a slide bar 43 extended from the forwardly extending portion 44 of this housing part 41 and to the side thereof to be bumped by a portion of a cross slide on the turret lathe in a manner best shown in FIG. 8 and a rearward cover part 46 secured to the forward housing part 41 by attaching bolts 47 and from which an integral mounting stud 48 extends for attachment into a turret head 49 of the lathe by bolt and clamp part assembly indicated generally at 51 in FIGS. 9 and 10.

Interposed between the housing part 41 and the rear cover plate 46 is a gear shaft supporting plate 52, FIGS. 3 and 5 and secured therebetween against axial displacement by the fastening screws 47 that hold the rear plate 46 in engagement with the housing part 41. Four flat headed screws 53 enter plate 52 to secure the plate on to the housing part 41 and disposed at four corners of the housing part will, with the aid of dowel pins, not shown, keep the plate 52 in a more secure and aligned manner for the drive shafts and gears supported on the plate 52.

In the forward end of the forwardly projected portion 44 of the housing part 41 is a ball bearing unit 54 in which one end of a driven shaft 56 is mounted for rotation with the inner race thereof and the other end of this shaft 56 is reduced in diameter and journaled in a sleeve bearing 57 carried by the intermediate plate 52. The slide 43 is abutted by a portion 58 as shown in FIG. 8 on a cross slide 59 of the lathe. This slide bar is slidable into and out of an opening 59 in the housing projection 44 that is held against outward displacement therefrom by a stop screw 61 carried on the inner end of the slide 43 and extending through the opposite sides of the housing projection 44 as seen in FIG. 8 and has a spring 62 that will return the slide 43 after it has been bumped by the portion 58 on cross slide 59. This slide 43 is of square section and has rack teeth 63 that mesh with a pinion 64 tight fitted upon the forward end of the driven shaft 56 so that the shaft 56 is rotated by the inward movement of the slide bar 43.

The shaft 56 has a pre-acceleration gear 66 that has ratchet teeth 67 on the front face thereof adapted to be engaged to be turned by a clutch part 68 that is splined and inwardly extending projection 69 slidable in a shaft spline groove 71 and has its ratchet teeth 72 urged into engagement with ratchet teeth 67 on the large freely turning gear 66 on the shaft 56 by a compression spring 73 surrounding the shaft 56 and reacting against a washer 74 lying against the shaft pinion gear portion 64.

The large gear 67 meshes with a pinion gear 76 on a spindle shaft 77 so that the spindle shaft 77 is pre-accelerated by the instant rotation of gear 66 resulting from inward movement of the slide 43. This spindle shaft 77 is journaled at one end in the forward wall of the housing in a bushing or ball bearing unit 78, FIG. 3. This spindle shaft 77 extends forwardly from the front of the housing part 41 and has a reduced end 79 to which the drill chuck 42 is tight fitted or splined, this clutch 42 contains a bushing 81 of C-shaped section and adapted to be squeezed against a drill element 82 for engagement with a workpiece 83 by a set screw 84 in the spindle clutch 42.

The rearward end of this spindle shaft 77 is reduced in diameter and shouldered against the forward face of the intermediate plate 52 at 86. A compression spring 87 lies on the opposite side of the plate 52 amd with the reduced end of the spindle shaft 77 extends into a pocket or recess 88 in the rear plate 46. This compression spring 87 is backed up by a washer 89 and an adjustable nut 91 threaded upon the reduced end of the spindle shaft. This spring 87 will bias the axial thrust of the shaft 77 and the end of the drill element 82 against the work 83 to in affect serve as a self feeding means upon the spring 87 being compressed by a thrust of the workpiece 83 against the drill element 82 to slide the shaft inwardly. This action is best illustrated in FIG. 4 where the spindle shaft 77 has been thrust inwardly against the action of the spring 87 and when extended would assume the dotted line position of FIG. 4.

The spindle shaft 77 has splines 92 at its rear end on which pinion gears 93 and 94 which are straddled by two large gears 96 and 97, as best viewed in FIGS. 2 and 5, and which are in turn through their respective pinions 98 and 99 placed in mesh respectively with large gears 101 and 102 which again have respective pinion gears 103 and 104 that straddle and engage with a large two part gear indicated generally at 106 that provides the main drive gear and which is splined to the slide bar driven shaft 56 as indicated at 107 in FIG. 3. Each of the gears 96, 97, 101 and 102 have stud shafts 108 that are journaled in a bushing 109 provided in the intermediate plate 52. Each of these same large gears have forwardly extending stud shafts 111 that may be journaled in appropriate bosses, not shown, but can be provided in the housing part 41. It will thus be seen that through the several large gears and pinion gears that once the spindle shaft 77 has been pre-accelerated that a main drive gear assembly 106 may take over the drive while permitting the gear 66 to slip so that thereafter increased speed as effected through the gear train provided by the several gears 96, 97, 101 and 102, can serve to build up the speed of the drill 82 for effecting a positive and quick drilling action upon the workpiece 83.

The main drive gear 106 has an outer ring part 116 that has external gear teeth 117 that are in mesh with the pinion gears 103 and 104 of large gears 101 and 102. Upon the inner periphery of the outer ring gear 106 are widely spaced inwardly extending teeth 118 meshed and locked with external teeth 119 for some lost motion movement as indicated by spacing 121 between the teeth and of an inner ring 122, which is in turn connected on its inner periphery for rotation upon the shaft 56 in the same manner that the gear 66 is connected to the shaft 56 for free rotation. In order to cushion the lost motion movement and take up any slack in the drive between the internal and external rings 122 and 116, a large arcuate space 124 is provided in the inner periphery of the external gear ring 116 and circumferentially aligned with the teeth 118 thereof to accommodate a compression spring 125 that will react between one tooth 118 of the external ring gear 116 and one tooth 119 of the inner ring 122. Thus there has been provided a shock absorbing gear 106 that can take up any lost motion to allow immediate drive action of the large gear 66 upon the spindle shaft 77 that will put the gear train in motion as the main gear assembly 106 takes over the main drive.

The drive for the gear 106 is affected through a ratchet plate 126 that locks with ratchet teeth projections 127 on the forward face of the inner gear ring 122. This ratchet ring 126 in effect is a part of the gear 106 so that when the ratchet teeth are in locked engagement the ratchet ring 126 and gear 106 rotate together. Plate 126 are best indicated at 127 in FIG. 5 and these ratchet teeth are normally held into locked engagement with the ratchet teeth 127 upon the two ring gear 106. The ratchet plate 126 is backed up by a compression spring 129 on the shaft 56 and in engagement with the gear 66. This spring 129 is stronger than the spring 73 so as to hold the gear 66 in engagement with its ratchet plate 68, the ratchet plate to the left in engagement and stopped against the left end of the keyway 71. The spring 73 is strong enough to keep the ratchet plate 68 in engagement with its gear 66 so that the first drive is effected through this gear 66 with the spindle shaft 77 before the main drive gear 106 has been driven to take over the drive of the spindle shaft 77 and the drill element 82. At this time the ratchet teeth on the gear 66 will overrun the ratchet teeth on its plate 68 and drive will be effected through the ratchet plate 126 and its gear 106 and through the train of gears to give to the spindle its final drilling for speed.

In FIGS. 9 and 10 it will be clearly seen that the mounting shank 48 is formed with a flat elongated surface 131 which is adapted to seat in a notch provided by inclined faces 132 and 133 cut respectively in a clamp bushing 134 and a clamp nut 135. These inclined cuts oppose one another and provide a notch, the cut surface 132 engaging a flat surface 131 while the cut surface 133 is rounded to engage the arcuate surface of the shank. These parts are locked together in a turret opening 136 that extends downwardly from the top face of the turret head 49 and are made secure together by a clamp bolt 137 having a head 138 with clamp washers 139 lying thereunder and brought into flush engagement with the top surface of the turret head 49. In this manner the attachment is held rigidly in place against rotation with its shank and against radial displacement from its turret head 49.

In FIG. 8 a tool post 141 with its lock bolt assembly 142 that normally supports a cutting element 143 secures upon cross slide 59 a bumper 144 that serves as the cross slide 59 is adjusted to bump the rack slide 43 of the turret drill attachment 40.

The cross slide 59 by a cam operated segment 146 pivoted upon a pin 147 and having gear teeth 148 meshing with rack gear teeth 149 of the cross slide 59. This gear segment 146 will be worked by a cam 151 rotated by a longitudinally extending drive shaft 152 of the lathe. The gear segment 146 has a finger extension 153 with a cam roller 154 that will follow the cam edge 156 of the cam 151.

Referring now particularly to FIGS. 11, 12 and 13, there is shown another form of a gear driven revolving or rotary tool attachment adapted to remove cut-off burrs from a cut end of a workpiece. This assembly comprises a solid block rectangular shaped body 161 with a mounting shank 162 adapted to be mounted in the manner above described in a turret head 49 against rotation and radial displacement. This tool body 161 has a central recess 163 of a diameter somewhat equal to the diameter of the integral mounting shank 162 and open at the front face of the body. Slidably mounted in this central recess is a bushing 164 and inside this bushing is a collet closing sleeve 165 with a pivotally mounted leaver 166 and within the collet closing sleeve or ring 165 is a collet 167, this collet 167 has a reduced threaded inner end 168 providing a shoulder 169 thereon. A sleeve 171 is threadedly connected to the reduced ends 168 of the collet 167 and extends through the mounting shank 162. A bushing 172 surrounds this sleeve 171 that extends through the shank to allow the collet to be rotatable therein. A washer 173 and lock nuts 174 and 175 are threaded on the outer end of the sleeve 171 for adjustable securing the collet in the bushing 162 and the body 161. A split ring 176 surrounds the bushing 164 and engages with a closing sleeve 177 that can work the lever 166 to act upon the collet closing sleeve 165.

In use the tool attachment will be advanced over a workpiece. The means for clamping the collet 167 on the workpiece and for rotating the collet and workpiece comprises a push bar or slide 178 adapted to be actuated by the portion 58 of the cross slide 59 in the same manner that the slide 43 of the attachment 40 is worked as shown in FIG. 8. This push bar 178 has a cam groove 179 that receives a roller 181 on the lower end of a tapered lever 182 that engages with the split ring 176 to work the collet lever 166 and the closing ring 165 by pivotal movement about its dropped fulcrum edge 183.

The push bar 178 has rack teeth that engage with a pinion 184 that will rotate a shaft 185 and a large gear 186, FIG. 11, forward movement of the bushing effected by the tilting of the lever 182 effects a closing of the collet ring 165 forwardly against and upwardly and outwardly tapered end 187 of the collet 167 thus closing the collet on the workpiece. Continued inward movement of the push bar 178 will revolve the collet through a series of gears mounted in the block body 181 and including pinions, all of which are geared together following sequence with the gear 186 by pinion gear 188, large gear 189, large gear 191 on shaft 192, pinion gear 183 with large gear 194 on shaft 195 and the large gear 194 engaged with a collet gear 196 surrounding the collet sleeve extension 171 and held in place by a washer 197.

It will thus be apparent that there has been provided by the attachment shown means for effecting the closing of the collet and by continual movement of the pusher bar effect the rotation of the collet to effect a working operation of the attachment for removing the burr from the end thereof by a cutting tool element 143 on the cross slide 59. With the attachment of FIG. 11 being used in place of the attachment 40 as shown in FIG. 8, it can be seen that the cutting tool 141 can be made available to effect a deburring of a workpiece retained and supported in the collet 167. Gears are made use of in this attachment to effect the rotation of the collet and the workpiece in the same manner that the gears are used to effect the rotation of a drill tool element as described in connection with the first form of the invention, and as will be more apparent with the description of further forms of the invention to be made. As seen in FIG. 13, the pusher bar 178 has a laterally extending member 198 that engages a large return spring 199 lying in an opening 201 which has on the opposite side of the member 198 a buffer return spring 202 in the same opening 201 and held in engagement against outward displacement by a pin 203. The spring 199 is held against outward displacement by an upwardly extending projection 204 at the opposite end of the opening 201. The slide bar 178, as shown in FIG. 13 has adjoined to it by pins 205 and 206 a member 207 of the same length and containing the slots 179.

Referring now to FIGS. 14 and 17, there is shown a rotating tool assembly, including a gear train for fast rotation of the drill element resulting from impact bumping of a cross rack slide from either one side or the other and in which a drill spindle can be replaced within the tool casing by a tap tool spindle. In this form of the invention 220 represents generally the attachment and this attachment comprises a rectangular shaped hollow casing 222 having a front wall 223, a rear wall 224, side walls 226 and 227, a bottom wall 228 and a top wall 229. The front wall 223 has an enlargement 231 at the lower part thereof. A mounting stud or shank 232 extends rearwardly from the rear wall 224 for engagement with the turret head in the same manner as above described in connection with the other forms of the invention and having a flat side for engagement by the clamping parts to prevent rotation in the turret head. The front wall 223 has a large central opening 233 through which a drill chuck 234 extends this opening 233 is axially aligned with the rearwardly extending stud 232 on the rear wall 224. This drill chuck 234 is part of a spindle shaft 236 that has a pinion gear 237 and a spring clip retaining groove 238 on its rear end which in cooperation with a washer 239 and a spring clip 241 holds a spindle 236 against outward axial displacement from a bearing bracket 242 secured by screws 243 to side wall 227 of the casing 222, the drill chuck 234 is journaled in the opening 233 of the front wall 223 so that the spindle 236 is held in axial alignment with the rearwardly outstanding mounting stud 232 and for rotation. The drill chuck 234 retains a drill element 244 in a bushing 246 of C-section by a set screw 247 that squeezes the bushing 246 about the drill shank, FIGS. 17 and 19.

In FIG. 18, there is shown a spindle 236' that can be assembled in the casing 222 and adapted for use with a drill tap 248. This spindle 236' is longer than the spindle 236 and has a reduced rear end portion 249 on which is mounted a tension spring 251 that is adjustably retained upon the reduced diameter portion 249 by an adjustable nut 252 to which it is secured. The opposite ends of the spring 251 will be secured to the washer 239 and the tendency of the spring is to hold the shaft 236' in the dotted line position as shown in FIG. 18 and operable to feed the tap drill as the attachment is being used to effect a tapping operation.

Slidable transversely through the forwardly extending portion 231 of the casing 222 is a transversely adjustable slide or rack bar 251 adapted to be bumped from either side of the casing as shown in FIG. 16 by a cross slide portion 252 or 253. The rack bar 251 is meshed with a pinion gear 254 carried on a small shaft 256 journaled in the forward end of the casing portion 231 and its other end may be journaled in a boss portion provided in the casing. This shaft 256 carries a large gear 257 that will be rotated by the shaft 256 and which lies astraddle under pinion gears 258 and 259 on respective large gears 261 and 262 which in turn respectively engage with large gears 263 and 264. These large gears 263 and 264 respectively engage with pinions 265 and 266 of larger gears 267 and 268 that lie astraddle over a pinion 269 of a centrally disposed large gear 271 which in turn will drive pinion 237 and spindle shaft 236 or 236'. In this manner a small movement of the rack bar 251 will effect a greatly stepped up rotation of the spindle shafts 236 or 236' so as to effect a complete drilling or tapping operation that is needed on a workpiece. Since no spring return is provided upon the rack mesher 51 the rack bar will be bumped from the opposite sides and can be used to effect reverse drilling of the tap drill 248 when tapping a drilled opening.

Figures 21, 24:
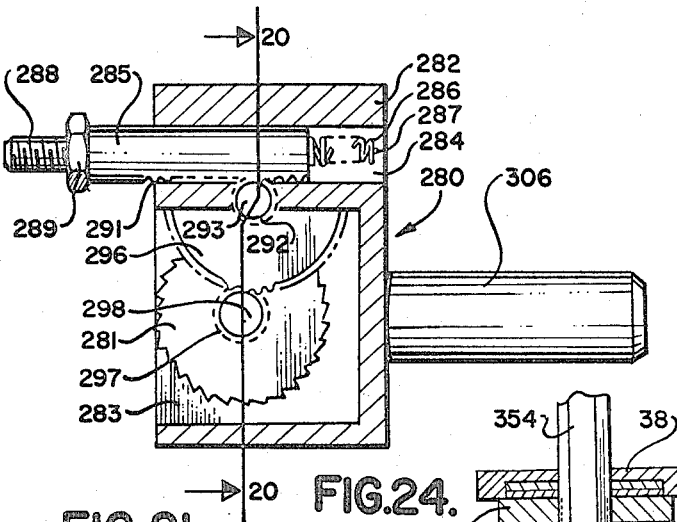
FIG. 21 is a longitudinal sectional view taken on line 21—21 of FIG. 20.
FIG. 24 is a fragmentary detail sectional view of the drill tap drive and slide mounting as viewed generally on line 24—24 of FIG. 23.

In FIGS. 20 and 21, 280 represents generally a tool assembly for slotting and milling a workpiece with a rotary saw cut tool element 281. This attachment 280 comprises a rectangular shaped solid block body 282 having a compartment 283 open at the front of the attachment and having a round longitudinal extending passage 284 in which a slide rack bar 285 is worked against the action of a compression spring 286 anchored in the opening 284 by a cross pin 287 and this spring 286 urges the rod 285 forwardly. The rod 285 has a stud bolt 288 adjustable from the forward end of the rack bar 285 and held in place in its adjusted position by a lock nut 289. The rack bar 285 has rack teeth 291 that engage and drive a pinion gear 292 on a transversely extending shaft 293 extending across the compartment 283 and journaled respectively at its ends 294 and 295 in the opposite sides of the block body 282. Fixed to the shaft 293 adjacent its end 295 is a large gear 296 that when turned will drive a small pinion 297 on a shaft 298 that extends parallel to the shaft 293 and is journaled at its ends 299 and 301 in the opposite sides of the body 282 and carries its saw cut disc 281. This shaft 298 has an intermediate threaded portion 302 on which the disc 281 can be adjusted axially thereon and laterally of the attachment and held in its adjusted position by lock nuts 303 and 304. It will thus be apparent that by pumping the threaded stud 288 of the push rack bar 295 that an accelerated turning of the cutting disc 281 will be effected to cause a work piece to be milled and slotted by the attachment. The attachment can be mounted on the turret head by rearwardly extending mounting shank 306 as above described and the rack bar 285 worked by a movable portion of the machine lathe operable in a longitudinal direction therealong.

Figure 22:
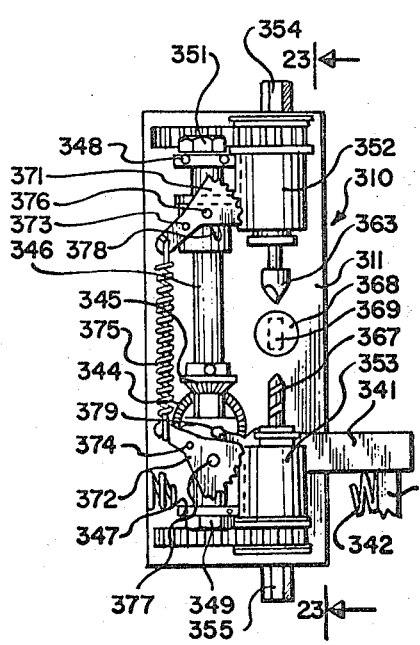
FIG. 22 is a front elevational view of a cross drilling tool attachment assembled according to another form of the invention, with portions broken away and with a workpiece in position in alignment with the drill and tap tool elements.
Figure 23:
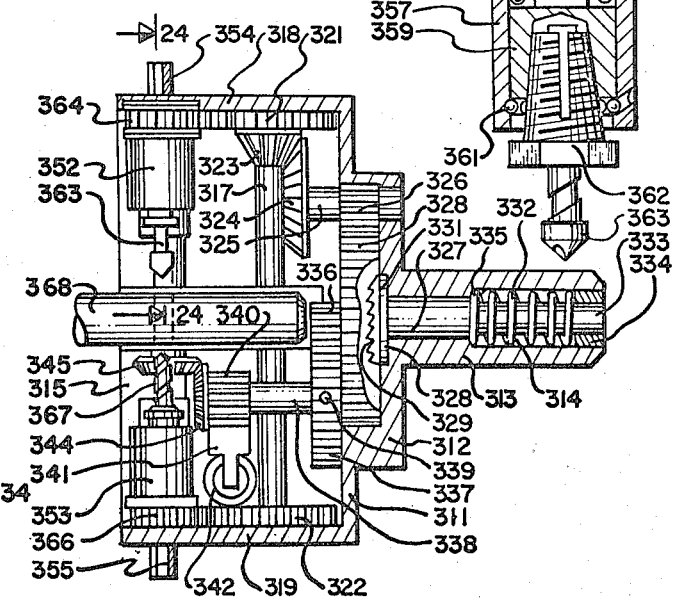
FIG. 23 is a vertical sectional view of the cross drill attachment of FIG. 22 as viewed generally on line 23—23 thereof.
Figures 25, 26:
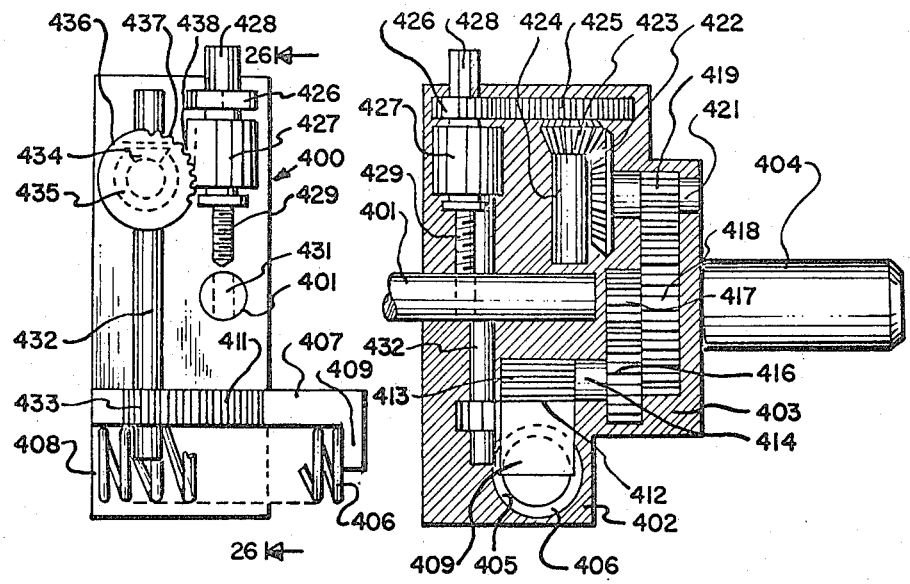
FIG. 25 is a front elevational view of a cross tapping attachment, according to another form of the invention, with a workpiece in place within the attachment.
FIG. 26 is a longitudinal sectional view of the screw tapping attachment of FIG. 25, as viewed on line 26—26 thereof.

Referring now to FIGS. 22 to 24, there is shown a still further form of the invention in a turret two spindle cross drilling attachment indicated generally at 310. This attachment 310 comprises a substantially solid body 311 with an enlargement 312 at the rear thereof from which rearwardly extends a mounting shank 313. This mounting shank 313 has a central bore 314 that extends rearwardly therethrough and through the rear extension 312 for communication with an open front space 315. A shaft 317 is journaled at top and bottom forwardly extending portions 318 and 319 and fixed to the upper end of the shaft flush against the upper portion 318 is a large gear 321 and fixed to the shaft 317 and flush upon the bottom body portion 319 is a similar large gear 322. A bevel pinion 323 is fixed to the upper end of the shaft 317 adjacent to gear 321 and meshes with a beveled gear 324 fixed on a stud shaft 325 and journaled in the rear wall extension 312. A pinion 326 is fixed on the shaft 325 and lies within the extension 312. A shaft 327 is jouranled in the shank bore 314 and fixed on the forward end of this shaft 327 and in the rear extension 312 is a ratchet gear 328 having ratchet teeth 329 meshing with teeth on a spring-pressed ratchet 331 on the inner end of the shaft 327 that is forwardly spring-pressed by a compression spring 332 surrounding a reduced diameter end 333 of the shaft 327 and held in place against outer displacement from the bore 314 by a retaining ring 334 threaded into the end of the shank and the spring 332 reacting between the retaining ring 334 and against a shoulder 335 on the shaft 327 to hold the ratchet gear 328 against the ratchet teeth 329 of the gear 326. The gear 328 meshes with the pinion 326. A pinion gear 336 is provided on the inner end of the shaft 327 and meshes with a gear 337 fixed on a drive shaft 338 by a shear pin 339. On the other end of the shaft 338 is a pinion 340 which is operated by a rack bar 341 adapted to be bumped in a manner above described in connection with the other forms of the invention and spring biased to a return position by a return spring 342 reacting as shown in FIG. 22 between the side of the main body 311 and a projection 343 on the rack bar 341. On the same shaft 338 with the pinion 340 is a bevel gear 344 that meshes with a bevel gear 345 carried on a shaft 346 that extends parallel to the shaft 317 and is journaled on the body 311. Blocks 347 and 348 and held in axial displacement thereagainst by shaft bolts heads 349 and 351 threaded into the opposite ends of the shaft 346. It will thus be seen that upon the rack bar 341 being bumped to turn the gear 340 that the double gear 344 thereof will turn through beveled gear 345 the shaft 346.

Tap spindle 352 and drill spindle 353 are journaled respectively in the upper forwardly extending portion 318 and lower extending portion 319 for axial adjustment on their respective spline extensions 354 and 355. Each spindle 352 and 353 has a casing, as best seen in FIG. 24, at 357 that is rotatably mounted upon the splined shaft in a ball bearing connection 358 therewith adjacent an enlarged head or chuck 359. A ball bearing connection 361 is provided upon the outer end of the casing with the chuck head 359. A threaded tool chuck that is tapered and split as indicated at 362 is threaded into place in the head 359 and extends outwardly thereof to retain a tap tool element 363. A splined gear 364 is carried on the spline extension 354 or 355 and this gear meshes with gear 321 on the shaft 317. At the bottom of the attachment the drill assembly 353 has a gear 366 that meshes with the gear 322 at the bottom of the body 311 and on the shaft 317. The drill tool assembly 353 carries a spiral drill element 367. This drill element 367 is in axial alignment with the tap drill element 363 so that a work piece 368 can be drilled and tapped by first one motion of the drill 367 then the opposite motion of the tap 363 to provide a tapped hole 369 in the workpiece 368.

A pair of complemental upper and lower gear segments 371 and 372 are pivotally connected respectively by pins 373 and 374 to the front of the body 311. A tension spring 375 connects both ends of the gear segments 371 and 372 together. These gear segments are moved by pins 376 and 377 extending into cam lobe 378 and 379 turned by the shaft 346. As these gear segments 371 and 372 are turned, the tap drill and drill assemblies 352 and 353 will be moved toward each other, either together or in a manner provided by the cam lobes 378 and 379 to work alternately upon the workpiece 368.

It can thus be apparent that by bumping the cross slide 341 through the pinion gear 340, large shear gear 337, rear wall gear 328, pinion gear 326, differential gears 324 and 323, large gears on the ends of the shaft 317 at 321 and 322 that by engagement of these respective gears with the respective gears 364 and 366 that the tap drill and drill assemblies 352 and 353 will be rotated to effect the work operation upon the workpiece 368. It should also be apparent that by the same motion of the rack bar 341 that a working of the shaft 346 is effected to cause through cam lobes 378 and 379 the drawing together of the tap assembly 352 and the drill assembly 353 by their respective segments 371 and 372 to effect the working operations upon the workpiece 368. This is done at the same time that the spindles are operated.

In FIGS. 25 to 27, 400 represents a cross tapping tool attachment similar to the attachment just described, but differing in that only one spindle assembly is used and no ratchet is provided for disengaging an overloaded gear train. Also a shear pin is dispensed with. This assembly 400 is for effecting a threading operation upon a workpiece 401 and comprises a solid block body 402 having a rear extension 403 from which a mounting shank 404 extends rearwardly and adapted to be extended into a turret head in the manner above described in connection with the previous forms of the invention. In the bottom of the body 402 is a round opening 405 and which is worked a compression spring 406 that extends outwardly and serves as a return spring for a rack bar 407 adapted to be bumped by an external part to supply power to the attachment. This spring 406 is in abuttment with the closed end 408 of the opening 405 and on its free end externally of the body 402 it engages a depending end portion 409 of the rack bar 407. The rack bar 407 has two sets of rack teeth, one set at the side of the rack bar as indicated at 411 in FIG. 25 and the other set on top of the rack bar as indicated at 412 which will mesh with a pinion 413 of a shaft 414 with a gear 416 thereon, which drives a gear 417 serving as a pinion on a large gear 418 in the rear extension 403 and which in turn meshes with a pinion gear 419 fixed to a shaft 421 journaled in the rear extension 403 and has a bevel gear 422 thereon which in turn drives a bevel gear 423 on a shaft 424 journaled in the body 402 and which in turn has a laterally extending gear 425 that meshes with a gear 426 fixed to a screw tap assembly 427 and adapted for vertical adjustment by a spline connection 428 extending from the top of the body 402. This thread tap spindle assembly 427 has a thread cutting tool 429 adapted to be aligned with a cross cut hole 431 in workpiece 401 to effect a threading operation therein as the thread tap and spindle assembly 427 is feed axially into the workpiece.

Journaled vertically in the body 402 is a vertically extending shaft 432 that will be rotated by the rack teeth 411 on the side of the rack bar 407 engaging with a pinion gear 433 so that the shaft 432 will be rotated to rotate a bevel gear 434 connected to the upper end thereof that in turn drives a bevel gear 435 and a gear segment 346 which has teeth 437 that work in a vertical gear rack 438 on the tap assembly 427 to cause at the same time with the rotation of the tap assembly within its external sleeve a vertical adjustment of the tap assembly to feed the tap thread element 429 into the opening 431 of the workpiece 401. It will be noted that both the adjustment of the tap spindle and its rotation is simoultaneously effected to complete a threading operation in the opening 431 of the workpiece 401. Reverse movement of the rack 407 under the action of the heavy turn spring 406 will cause reverse rotation of the various gears and the working of the thread tap 429 out of the threaded opening 431 in the workpiece 401.

Figure 27:
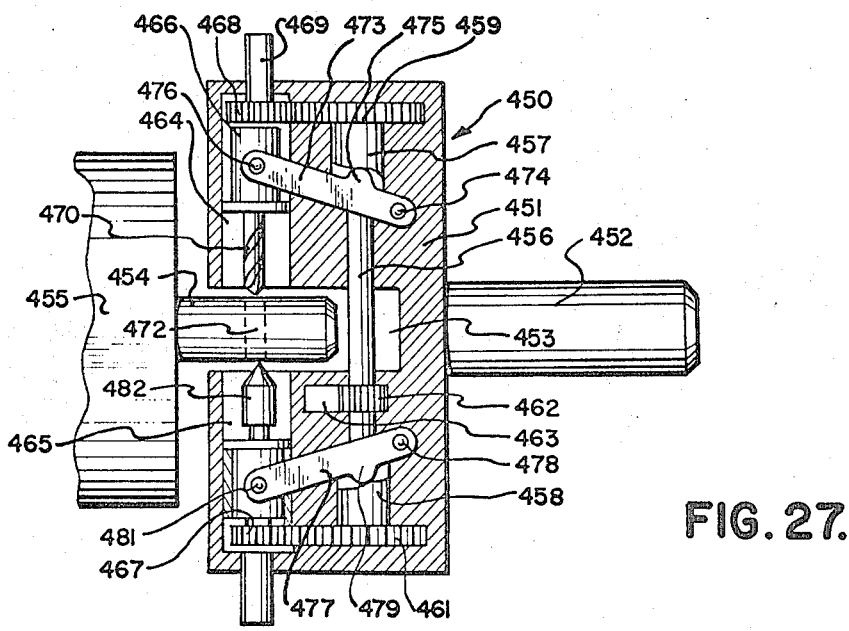
FIG. 27 is a longitudinal sectional view of a cross drilling and tapping attachment according to a still further form of the invention with the machine spindle and workpiece being shown in position within the attachment.

In FIG. 27 there is shown a two spindle cross drilling tool attachment for a turret head as indicated generally at 450 that comprises a solid block body 451 having a rearwardly extending mounting shank 452 for the turret and a central opening 453 into which a workpiece 454 is extended from a lathe chuck 455. A vertically extending shaft 456 is journaled in the body 451 and carries on its opposite end cam track members 457, 458 and work gears 459 and 461. On this shaft 456 is a pinion 462 that will be worked as above described by a rack bar 463 that will cause rotation of the shaft 456.

In the work body are opposing openings 464 and 465 in which there is vertically worked a drill assembly 466 and a tap drill assembly 467. These assemblies are constructed similar to the spindles described in connection with either of the above attachments and include respectively for the drill spindle 466 a gear 468 that meshes with the top gear 459 and a spline projection 469, this spindle 466 has a drill tool 471 to make hole 472 through workpiece 454. This spindle 466 is worked toward the workpiece 454 by a cam lever 473 pivoted on the body 451 by a pin 474 and is worked by cam 457 by an extension 475 on the arm 473 engaging with the cam. The arm 473 is secured by a pin to the drill spindle assembly 466. A cam lever 477 is pivoted by a pin 478 for engagement by a projection 479 upon the cam 458 to work the cam lever 477 and the tap drill assembly 467 to cause engagement of the tap drill element 482 with the drilled opening 472 in the workpiece 454.

The drill and tap spindles 46 and 467 can be worked together or alternately depending upon the arrangement of the feed cams 457 and 458 that operate the spindles vertically through the cam engaging arms 473 and 477 respectively. It should be understood that the drilling operation should be effected ahead of the tapping operation and at least the drill element 471 partially withdrawn from a completed hole 472 that has been made before effecting engagement of the tapping tool element 482 with the open end of the hole 472.

When the operations have been completed the work chuck 455 will be withdrawn along with the workpiece 454 so that a new workpiece can be replaced in the lathe chuck 455.

Figure 28:
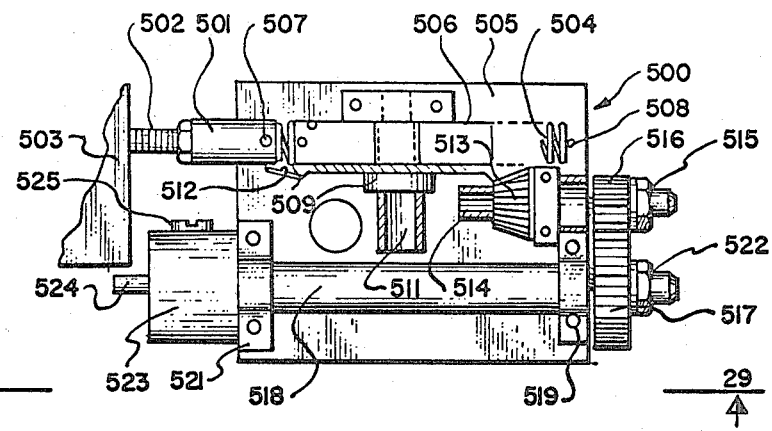
FIG. 28 is a front elevational view of a cross slide drilling and tapping tool attachment according to a still further form of the invention with portions broken away and parts shown in section.
Figure 29:
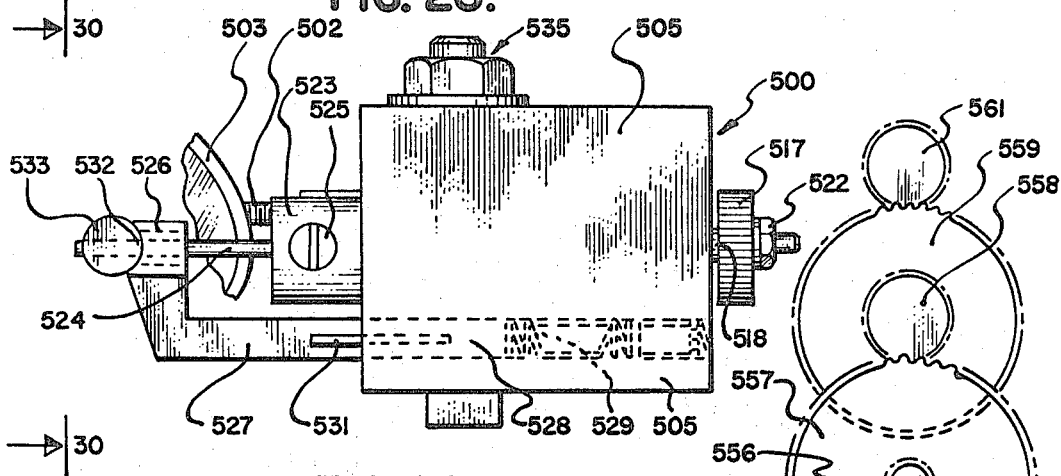
FIG. 29 is a bottom plan view of the drilling and tapping tool attachment of FIG. 28 as viewed on line 29—29 thereof.
Figure 30:
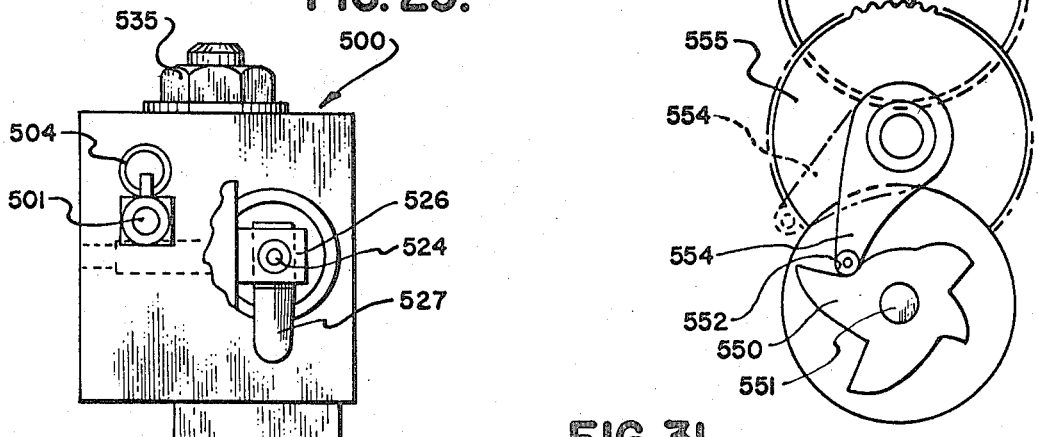
FIG. 30 is an end elevational view of the drilling and tapping attachment of FIG. 28 as viewed generally on line 30—30 of FIG. 29.

In FIGS. 28, 29 and 30 there is shown a still further form of a cross drilling and tapping tool attachment indicated generally at 500 that has a cross slide assembly 501 with a projecting threaded adjustable stud 502 adapted to be engaged by a bumper 503 to be moved laterally inwardly against the action of a return spring 504. This attachment 500 has a rectangular shaped body 505 with a passage 506 therein containing the compression spring 504 and serving as a guide for the rack bar 501. The return spring 504 is disposed between a pin 507 on the rack bar 501 and a pin 508 on the body 505. A gear 509 is fixed on a tubular shaft 511 that is operatively connected with the rack bar 501 and movement of the gear is imparted through the shaft 511 to a large bevel gear 512 that meshes with a bevel gear 513 on a tubular shaft 514 protruding outwardly from the body 505 and held in position by a bolt and nut assembly 515, this shaft 514 has a gear 516 that meshes with a lower gear 517 held on a long shaft 518 to drive the shaft 518 that is journaled in end block bearing 519 and 521. The gear 517 is held on this shaft 518 by a nut assembly 522. This shaft 518 carries on its opposite end a drill chuck 523 to which a drill tool element 524 is secured by a set screw 525.

Cylindrical bushing 526 is slidably supported on drill element 524 by means of an elongated angular bracket 527 slidable in a passage 528 in the bottom of the block body 505. This bracket 527 is pressed outwardly by a coil spring 529 positioned behind the inner end of the bracket 527 in the passage 528. An elongated closed slot 531 in the bracket 527 co-acts with a pin not shown to limit the outward axial movement of the bracket 527, the end face of the bracket at 526 is provided with a cradle face 532 to engage and support a workpiece 533 while being worked upon by the drill 524, the bushing member 526 guides the drill element 524 and insures that it will be started on dead center. The attachment can be fastened to the lathe by a bolt and nut assembly 535 in any conveinet manner.

Figure 31:
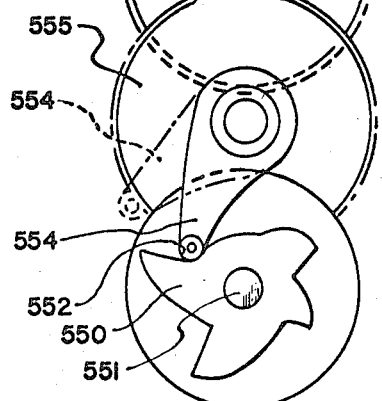
FIG. 31 is a diagrammatic view of a modified forward and reverse machine spindle drive that can be applied to the machine cam of FIG. 8.

In FIG. 31, there is shown a driving mechanism for driving a spindle by the cam shown in FIG. 8. This cam is generally of star shape as shown at 550 and is mounted on shaft 551 that contacts a cam roller 552 on a cam lever 553 that may be moved in dotted line position 554 by the cam 550 so as to drive a gear 555 that is in mesh with a pinion 556 which in turn has a gear 557 that is in mesh with a pinion 558 of a large gear 559 that drives a spindle 561. When the cam roll 552 is lifted to its highest point on the cam 550, the entire cam lever assembly will swing back by spring pressure to a lower point on the cam and the entire operation continued again to alter the drive of the spindle shaft 561. This gear train assembly is shown to show that a drive spindle of one form or the other can be attached to a cam on a drive shaft and by a gear train given the desired and complete work operation that is effected with the other forms of the invention by the rack slide bar.

It should now be apparent that there has been provided a turret lathe rotating tool attachments which can be attached to the turret of the lathe and which will provide its own power at increase speeds to effect the drilling or tapping operation by simply bumping a slide bar forming a part of the attachment. In all of these forms of the invention a spindle is rotated and at the same time adjusting movements for the various parts can be effected by the same movement of the slide bar by branch connection either with the slide bar or with the gear ring operated by the slide bar to effect simultaneously the working of the drill or tapping spindle while the drilling and tapping operation is being effected. By one bumping stroke upon the attachment slide bar a complete work operation is effected.

What is claimed is:

1. A self-driven turret lathe rotating tool attachment comprising a housing body having a first shaft journalled therein, said first shaft having a pinion gear, a slidable rack bar carried by the housing and engageable with the pinion gear of the first shaft to rotate the same upon the slide bar being bumped, said slide bar extending out of the housing to be bumped by external means, a second shaft journalled in the housing and extending parallel to the first shaft and serving as a spindle for the attachment of a rotary tool element to the second shaft to perform work, and a gear train interconnecting the first shaft and the second shaft whereby the second shaft will be rotated at increased speed, and said first and second shafts extending transversely across the housing and journalled in the opposite sides thereof, said housing being open at the front and said second shaft having a saw tooth cutting element for effecting a slotting operation on a workpiece operable from the front of the housing, and said slide bar being axially moveable from the front of the housing and said housing having a rearwardly extending mounting stud for the securement of the attachment on the turret head.

* * * * *